US008736353B2

(12) United States Patent
Bernstein

(10) Patent No.: US 8,736,353 B2
(45) Date of Patent: May 27, 2014

(54) POWER SUPPLY FOR LOCALIZED PORTIONS OF AN INTEGRATED CIRCUIT

(71) Applicant: International Business Machines Corporation, Armonk, NY (US)

(72) Inventor: Kerry Bernstein, Underhill, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/621,949

(22) Filed: Sep. 18, 2012

(65) Prior Publication Data

US 2014/0077871 A1    Mar. 20, 2014

(51) Int. Cl.
*G05F 1/10*    (2006.01)

(52) U.S. Cl.
USPC ............................. 327/538; 327/540; 327/541

(58) Field of Classification Search
USPC ......... 327/541, 530, 538, 540, 543, 545, 546, 327/560, 561, 562, 563
See application file for complete search history.

(56) References Cited

U.S. PATENT DOCUMENTS

| | | | |
|---|---|---|---|
| 5,973,545 A | 10/1999 | Raza | |
| 6,479,974 B2 | 11/2002 | Cohn et al. | |
| 6,509,725 B1 | 1/2003 | Bernstein et al. | |
| 6,760,262 B2 | 7/2004 | Haeberli et al. | |
| 7,402,854 B2 | 7/2008 | Bernstein et al. | |
| 7,579,902 B2 | 8/2009 | Frulio et al. | |
| 7,638,903 B2 | 12/2009 | Pelley, III et al. | |
| 7,692,977 B2 | 4/2010 | Kim et al. | |
| 7,741,736 B2 | 6/2010 | Clemo et al. | |
| 7,880,531 B2 | 2/2011 | Park | |
| 8,040,736 B2 | 10/2011 | Kwak | |
| 8,053,819 B2 | 11/2011 | Bernstein et al. | |
| 8,054,125 B2 | 11/2011 | Nervegna | |
| 8,169,257 B2 | 5/2012 | Pelley | |
| 2006/0044054 A1* | 3/2006 | Yamazaki et al. | 327/540 |
| 2009/0237152 A1* | 9/2009 | Do | 327/540 |
| 2011/0181348 A1* | 7/2011 | Ashida | 327/541 |

* cited by examiner

*Primary Examiner* — Lincoln Donovan
*Assistant Examiner* — Jung H Kim
(74) *Attorney, Agent, or Firm* — Gibb & Riley, LLC; David A. Cain, Esq.

(57) ABSTRACT

System and method system for regulating voltage in a portion of an integrated circuit. An integrated circuit has a voltage input and at least a portion that is less than all of the integrated circuit, which requires a local voltage level. A voltage selector establishes a target voltage for the portion. A first comparator compares the target voltage to the local voltage and generates a pull up control signal when the local voltage is below the target voltage. A second comparator compares the target voltage to the local voltage and generates a pull down control signal when the local voltage is above the target voltage. A pull up device, responsive to the pull up control signal, increases the local voltage according to the pull up control signal. A pull down device, responsive to the pull down control signal, decreases the local voltage level according to the pull down control signal.

10 Claims, 5 Drawing Sheets

POWER SUPPLY FOR LOCALIZED PORTIONS OF AN INTEGRATED CIRCUIT

BACKGROUND

The present disclosure relates to integrated circuit designs and, more particularly, to systems and methods for providing a supply voltage to a localized portion of an integrated circuit.

There are two major issues limiting the optimal use of voltage scaling. In order to minimize the power dissipation, ideally each circuit would be operating at its minimum voltage. Unfortunately, the complexities of multi-voltage power supplies and the routability issues of having a large number of power distribution grids limit this possibility. Another issue is wake-up time. When an idling circuit with a reduced voltage is suddenly required to perform an operation, the speed at which that circuit can perform will be limited by the rate at which that circuit's power rail can be raised to a higher voltage. Particularly in speed-critical systems, this additional delay can limit the utility of voltage scaling.

SUMMARY

According to one embodiment herein, a system for regulating voltage in a localized portion of an integrated circuit is disclosed. The system includes an integrated circuit having a voltage input. The integrated circuit comprises at least a localized portion that is less than all of the integrated circuit. The localized portion requires a local voltage level. A voltage selector establishes a target voltage level for the localized portion. A first comparator compares the target voltage level to the local voltage level and generates a pull up control signal when the local voltage level is below the target voltage level. A second comparator compares the target voltage level to the local voltage level and generates a pull down control signal when the local voltage level is above the target voltage level. A pull up device that is responsive to the pull up control signal increases the local voltage level when the pull up control signal is asserted. A pull down device that is responsive to the pull down control signal decreases the local voltage level when the pull down control signal is asserted.

According to another embodiment herein, an integrated circuit is disclosed. The integrated circuit includes a voltage selector connected to a first voltage source. A first comparator is connected to the voltage selector. A second comparator is connected to the voltage selector. A first voltage adjustment device is connected to the first comparator. A second voltage adjustment device is connected to the second comparator. The voltage selector establishes a target voltage level for a localized region of the integrated circuit. The first comparator compares a local voltage level of the localized region of the integrated circuit to the target voltage level and generates a pull up control signal when the local voltage level is below the target voltage level. The second comparator compares the local voltage level of the localized region of the integrated circuit to the target voltage level and generates a pull down control signal when the local voltage level is above the target voltage level. The first voltage adjustment device increases the local voltage level when the pull up control signal is asserted. The second voltage adjustment device decreases the local voltage level when the pull down control signal is asserted.

According to an additional embodiment herein, a method of providing power to a localized region of an integrated circuit is disclosed. According to the method, a voltage supply to the integrated circuit is established. A localized region of the integrated circuit is identified. The localized region comprises a portion of the integrated circuit. The localized region requires a local voltage level. A portion of the voltage supply is tapped. The portion comprises a target voltage level. The target voltage level is compared to the local voltage level. A pull up control signal is generated when the local voltage level is below the target voltage level. A pull down control signal is generated when the local voltage level is above the target voltage level. Responsive to the pull up control signal, the local voltage level is increased when the pull up control signal is asserted. Responsive to the pull down control signal, the local voltage level is decreased when the pull down control signal is asserted.

BRIEF DESCRIPTION OF THE DRAWINGS

The embodiments herein will be better understood from the following detailed description with reference to the drawings, which are not necessarily drawn to scale, and in which.

DETAILED DESCRIPTION

Embodiments herein provide a solution to two major voltage scaling issues: allowing for a large number of voltages and negligible wake-up time. A framework is provided for dynamically adjusting the supply voltage to many local groups on a per-cycle basis without requiring a separate power distribution network for each voltage. A single voltage distribution network may be used to generate an unlimited number of local 'virtual' power rails. In some embodiments, the voltage distribution network may use an adjustable duty cycle charge pump. By grouping circuits with common performance requirements together around each virtual power rail, the minimum amount of voltage required for each circuit can be provided. The local charge pumps generate any voltage smaller than the global distribution network, with accuracy limited by the minimum duty cycle increment. Because each of the local power rails has a much smaller capacitance than a global distribution network, the charge pumps may be designed to rapidly adjust local voltage levels to avoid wake-up latencies.

Figure 1:
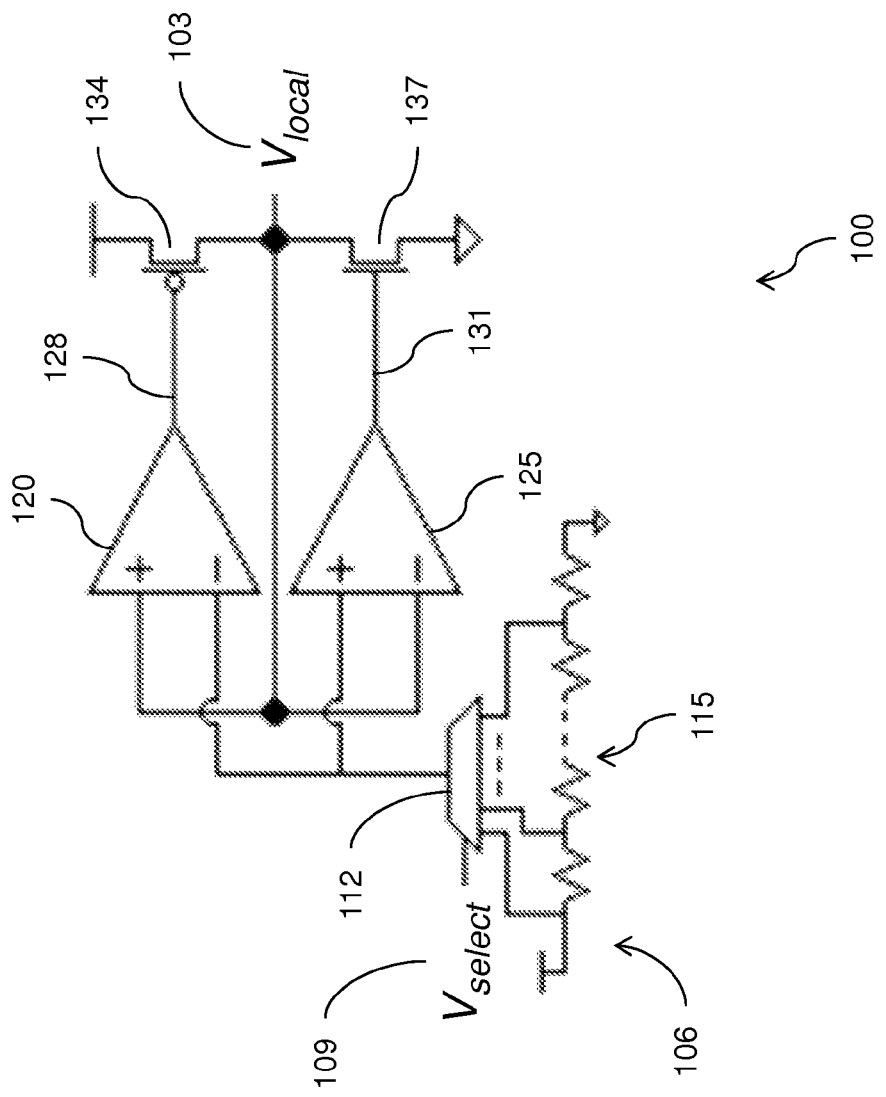
FIG. 1 is a block diagram illustrating a portion of an integrated circuit according to embodiments herein.

Referring now to the drawings, FIG. 1 shows a block diagram illustrating a segment, indicated generally as 100, of an integrated circuit according to embodiments herein. The segment 100 illustrates a voltage regulator for a localized portion of the integrated circuit that is less than all of the integrated circuit. According to embodiments herein, the localized portion requires a local voltage level, indicated as $V_{local}$ 103. In order to provide a local voltage level ($V_{local}$ 103) for the localized portion, a voltage selector 106 connected to a first voltage source establishes a target voltage level, indicated as $V_{select}$ 109. The voltage selector 106 may include a programmable multiplexor 112 that taps a selected voltage from the power supply for the entire integrated circuit, such as by a voltage over a specific branch of a resistor bank 115. The resistor bank 115 is one non-limiting example used to establish a minimum voltage in a region of the integrated circuit. Any appropriate technique for establishing the target voltage level ($V_{select}$ 109) may be used.

Segment 100 included a first comparator 120 and a second comparator 125. Each of the first and second comparators 120, 125 may be op amps having two inputs. One input to each comparator 120, 125 is the local voltage level ($V_{local}$ 103). The other input to each comparator 120, 125 is the target voltage level ($V_{select}$ 109). The first comparator 120 compares the target voltage level ($V_{select}$ select 109) to the local voltage level ($V_{local}$ 103) and generates a first output signal 128 when the local voltage level ($V_{local}$ 103) is below the target voltage level ($V_{select}$ 109). The second comparator 125 compares the target voltage level ($V_{select}$ 109) to the local voltage level ($V_{local}$ 103) and generates a second output signal 131 when the local voltage level ($V_{local}$ 103) is above the target voltage level ($V_{select}$ 109). The first output signal 128 is a pull up control signal and the second output signal 131 is a pull down control signal.

The first output signal 128 is provided to a pull up device 134 that is responsive to the first output signal 128. In one non-limiting exemplary embodiment, pull up device 134 may be a transistor, such as a p-channel MOSFET (metal-oxide-semiconductor field-effect transistor). The pull up device 134 increases the local voltage level ($V_{local}$ 103) when the first output signal 128 (pull up control signal) is asserted.

The second output signal 131 is provided to a pull down device 137 that is responsive to the second output signal 131. In one non-limiting exemplary embodiment, pull down device 137 may be a transistor, such as an n-channel MOSFET (metal-oxide-semiconductor field-effect transistor). The pull down device 137 decreases the local voltage level ($V_{local}$ 103) when the second output signal 131 (pull down control signal) is asserted.

According to embodiments herein, the framework avoids the design limitations of routing and power supply design. A new trade-off in determining how many local voltage networks can be used will depend on the overhead complexity of each adjustable duty cycle charge pump. To make the overhead unit as low-impact as possible, the comparators 120, 125 are used to control the duty cycle of the pull-up and pull-down devices 134, 137. In some embodiments, a differential output comparator can be used to control the pull-up and pull-down devices 134, 137. The comparator uses both the local voltage level ($V_{local}$ 103) and a reference target voltage level ($V_{select}$ 109) as inputs. The reference target voltage level ($V_{select}$ 109) is chosen via the voltage selector 106, which can be generated globally or locally.

Figure 2:
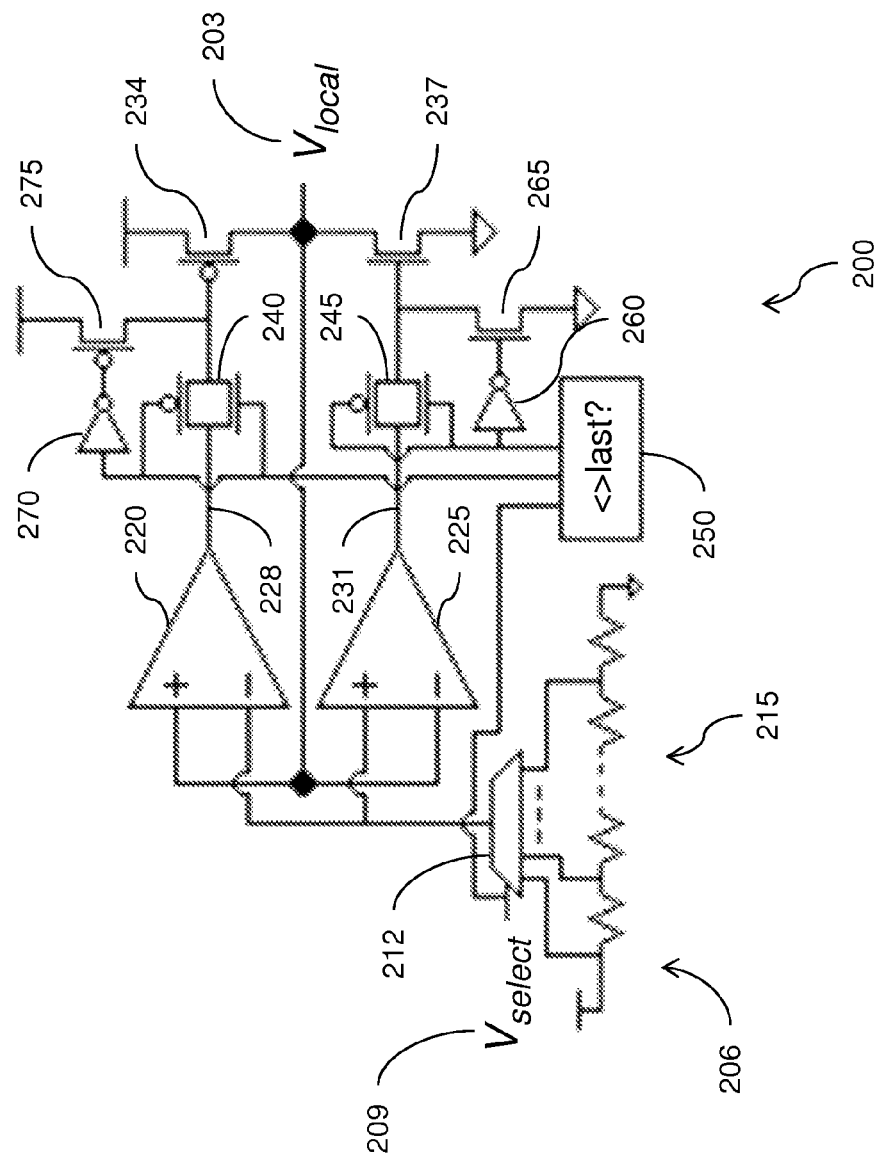
FIG. 2 is a block diagram illustrating a portion of an integrated circuit according to embodiments herein.

FIG. 2 shows a block diagram illustrating a segment, indicated generally as 200, of an integrated circuit having an additional control circuit according to embodiments herein. Similar to the circuit described above, the segment 200 illustrates a voltage regulator for a localized portion of the integrated circuit. The localized portion is less than all of the integrated circuit. According to embodiments herein, the localized portion requires a local voltage level, indicated as $V_{local}$ 203. In order to provide a local voltage level ($V_{local}$ 203) for the localized portion, a voltage selector 206 connected to a first voltage source establishes a target voltage level, indicated as $V_{select}$ 209. The voltage selector 206 may include a programmable multiplexor 212 that taps a selected voltage from the power supply for the entire integrated circuit, such as by a voltage over a specific branch of a resistor bank 215. The resistor bank 215 is one non-limiting example used to establish a minimum voltage in a region of the integrated circuit. Any appropriate technique for establishing the target voltage level ($V_{select}$ 209) may be used.

Segment 200 included a first comparator 220 and a second comparator 225. Each of the first and second comparators 220, 225 may be op amps having two inputs. One input to each comparator 220, 225 is the local voltage level ($V_{local}$ 203). The other input to each comparator 220, 225 is the target voltage level ($V_{select}$ 209). The first comparator 220 compares the target voltage level ($V_{select}$ 209) to the local voltage level ($V_{local}$ 203) and generates a first output signal 228 when the local voltage level ($V_{local}$ 203) is below the target voltage level ($V_{select}$ 209). The second comparator 225 compares the target voltage level ($V_{select}$ 209) to the local voltage level ($V_{local}$ 203) and generates a second output signal 231 when the local voltage level ($V_{local}$ 203) is above the target voltage level ($V_{select}$ 209). The first output signal 228 is a pull up control signal and the second output signal 231 is a pull down control signal.

The first output signal 228 is provided to a first pass gate 240 between the first comparator 220 and a pull up device 234. In one non-limiting exemplary embodiment, the pull up device 234 may be a transistor, such as a p-channel MOSFET (metal-oxide-semiconductor field-effect transistor).

The second output signal 231 is provided to a second pass gate 245 between the second comparator 225 and a pull down device 237 that is responsive to the second output signal 231. In one non-limiting exemplary embodiment, pull down device 237 may be a transistor, such as an n-channel MOSFET (metal-oxide-semiconductor field-effect transistor).

FIG. 2 shows a device 250 that includes a storage component and a comparator component. The storage component stores the selected value of the target voltage level ($V_{select}$ 209). When a new target voltage level ($V_{select}$ 209) is selected, the device 250 compares the new target voltage level ($V_{select}$ 209) to its stored value.

When the new target voltage level ($V_{select}$ 209) is a higher voltage, the device 250 provides a signal to inverter 260 that biases transistor 265, which causes the second pass gate 245 to close in order to turn off the pull-down signal 231, preventing the pull down signal 231 from reaching the pull down device 237. At the same time, the device 250 provides a signal to inverter 270 that biases transistor 275, which causes the first pass gate 240 to open in order to pass the pull-up signal 228 to the pull up device 234. The pull up device 234 increases the local voltage level ($V_{local}$ 203).

When the new target voltage level ($V_{select}$ 209) is a lower voltage, the device 250 provides a signal to inverter 270 that biases transistor 275, which causes the first pass gate 240 to close in order to turn off the pull-up signal 228, preventing the pull up signal 228 from reaching the pull up device 234. At the same time, the device 250 provides a signal to inverter 260 that biases transistor 265, which causes the second pass gate 245 to open in order to pass the pull-down signal 231 to the pull down device 237. The pull up device 237 decreases the local voltage level ($V_{local}$ 203).

The small voltage adjustment latency provides a degree of fine-tune control over the system. Using a global control of target voltage level ($V_{select}$ 209) an operation could be programmed to only activate necessary units, leaving the remainder of the system scaled to lower voltages and saving power. These voltages could also be adjusted depending upon frequency requirements, further improving the power dissipation.

For a more automated voltage optimization, the target voltage level $V_{select}$ 209) can be controlled using local feedback. For example, in order to reduce each section of a datapath to its minimum voltage requirement automatically, a set of test vectors could be applied at nominal voltage. Then, using either a simple comparator or a RAZOR-like scheme, as is known in the art, the voltage in each section could be progressively dropped until a failure occurs. Once the failure point is found, the system could then buffer the voltage appropriately to avoid errors. This method would have the added benefit of automatically compensating for process variation. The procedure could also be repeated after a specified change in temperature to compensate for those variations as well. The only form of variation the system would not be able to adjust for is temporal variations in voltage.

Figure 3:
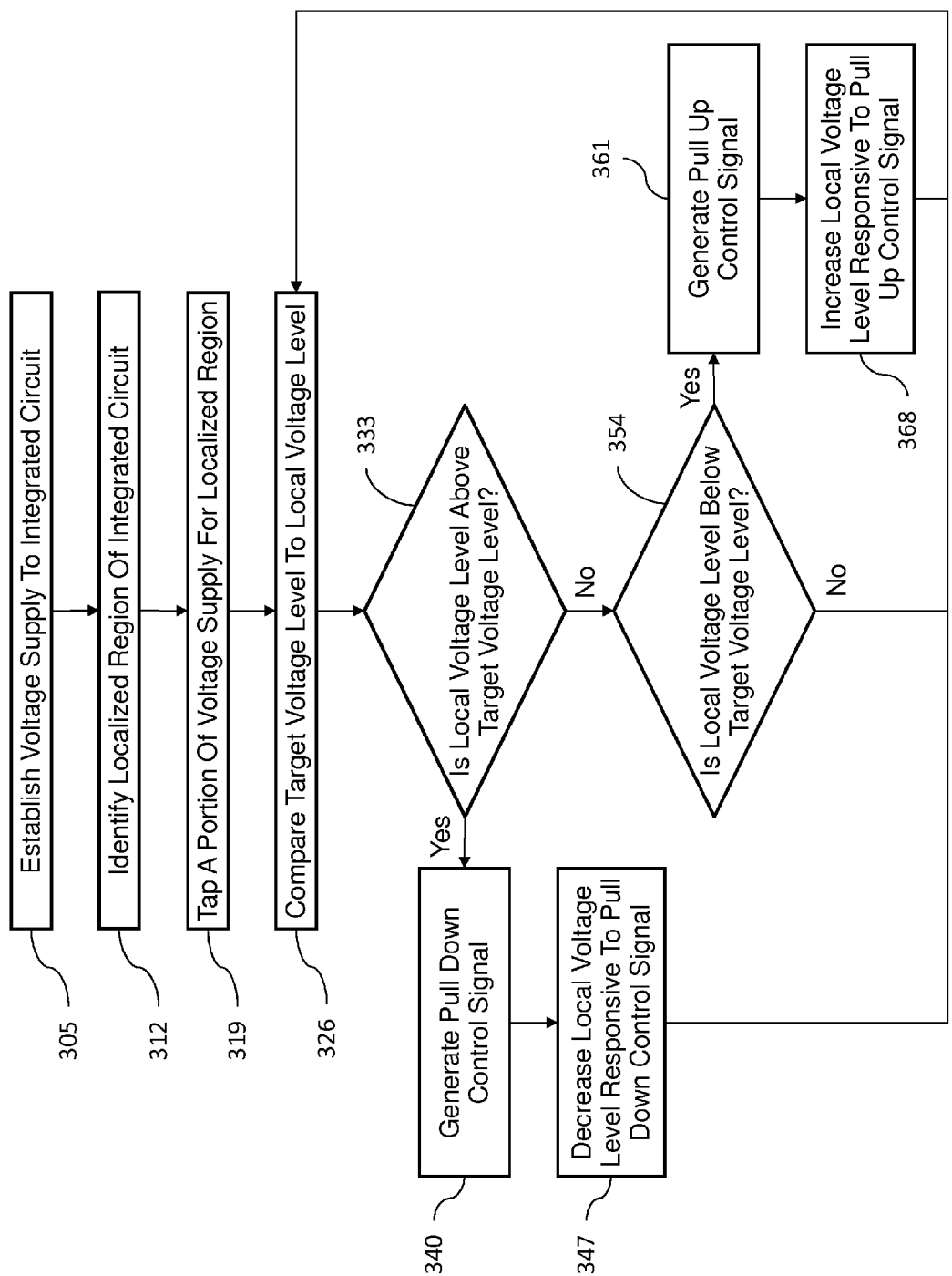
FIG. 3 is a flow diagram according to embodiments herein.

FIG. 3 is a flow diagram illustrating an exemplary method of providing power to a localized region of an integrated circuit. In item 305, a voltage supply to the integrated circuit is established. A localized region of the integrated circuit is identified, at 312. The localized region at least a portion of the integrated circuit and requires a local voltage level. At 319, a portion of the voltage supply is tapped. The portion that is tapped comprises the target voltage level. At 326, the target voltage level is compared to the local voltage level. Determine if the local voltage level is above the target voltage level, at 333. At 340, a pull down control signal is generated when the local voltage level is above the target voltage level. Responsive to the pull down control signal, the local voltage level is decreased when the pull down control signal is asserted, at 347. Determine if the local voltage level is below the target voltage level, at 354. A pull up control signal is generated when the local voltage level is below the target voltage level, at 361. Responsive to the pull up control signal, the local voltage level is increased when the pull up control signal is asserted, at 368.

Figure 4:
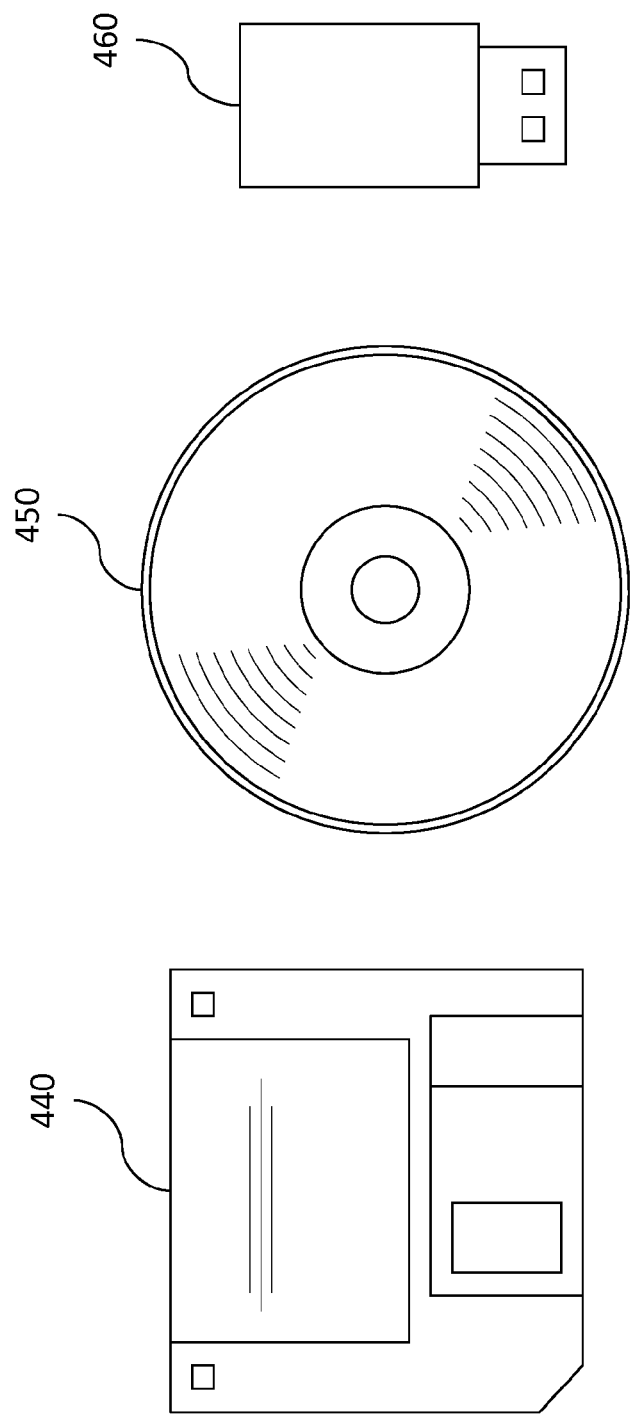
FIG. 4 is an illustration of articles of manufacture according to embodiments herein.

According to a further embodiment herein, an article of manufacture is provided that includes a computer readable medium having computer readable instructions embodied therein for performing the steps of the computer implemented methods, including but not limited to the method illustrated in FIG. 3. Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. FIG. 4 illustrates exemplary articles of manufacture, such as, a magnetic storage device 440, a portable compact disc read-only memory (CD-ROM) 450, and a "plug-and-play" memory device 460, such as a USB flash drive. Any of these devices may have computer readable instructions for carrying out the steps of the methods described above with reference to FIG. 3.

Aspects of the present disclosure are described herein with reference to flowchart illustrations and/or block diagrams of methods, apparatus (systems), and computer program products according to various embodiments. It will be understood that each block of the flowchart illustrations and/or two-dimensional block diagrams, and combinations of blocks in the flowchart illustrations and/or block diagrams, can be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Furthermore, the computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

In case of implementing the embodiments herein by software and/or firmware, a program constituting the software may be installed into a computer with dedicated hardware, from a storage medium or a network, and the computer is capable of performing various functions if with various programs installed therein.

Figure 5:
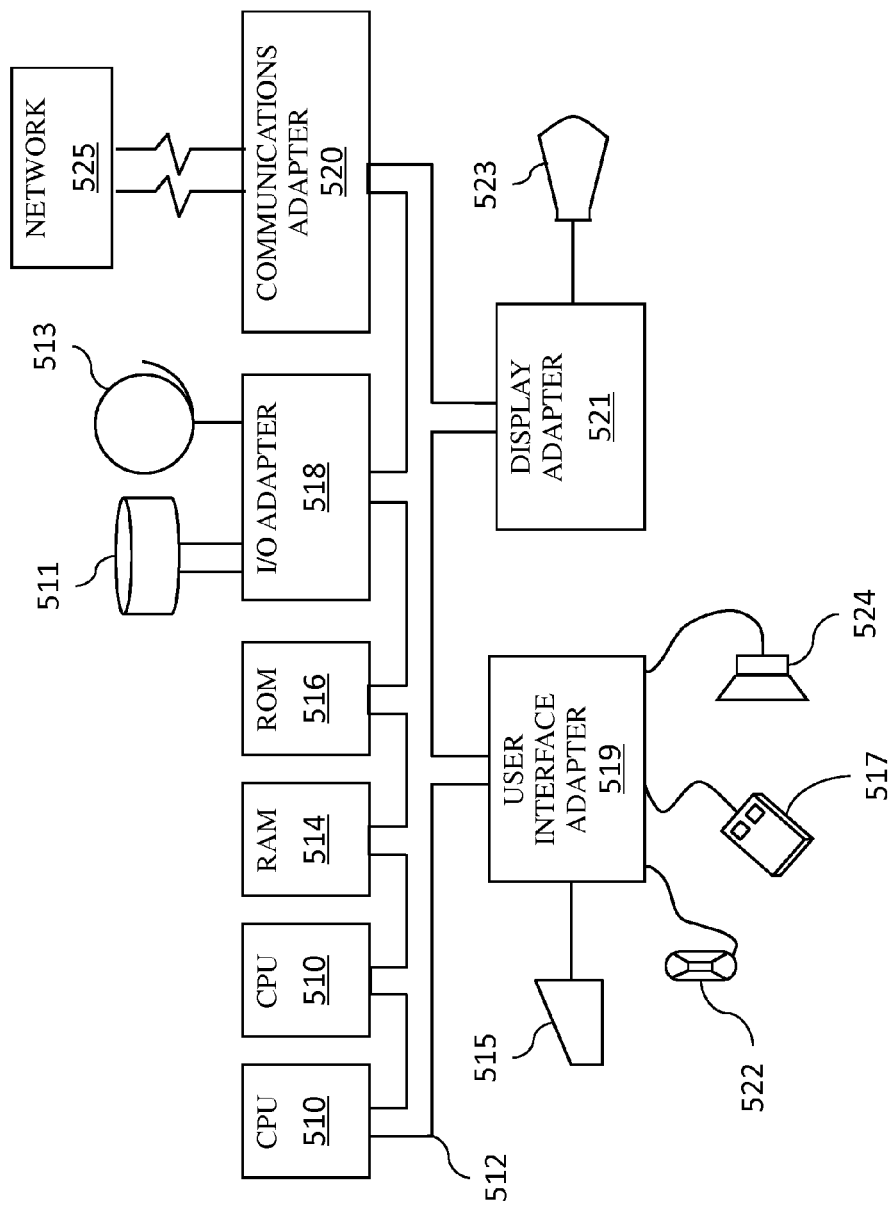
FIG. 5 is a schematic diagram of a hardware system according to embodiments herein.

A representative hardware environment for practicing the embodiments herein is depicted in FIG. 5. This schematic drawing illustrates a hardware configuration of an information handling/computer system in accordance with the embodiments herein. The system comprises at least one processor or central processing unit (CPU) 510. The CPUs 510 are interconnected via system bus 512 to various devices such as a random access memory (RAM) 514, read-only memory (ROM) 516, and an input/output (I/O) adapter 518. The I/O adapter 518 can connect to peripheral devices, such as disk units 511 and tape drives 513, or other program storage devices that are readable by the system. The system can read the inventive instructions on the program storage devices and follow these instructions to execute the methodology of the embodiments herein.

In FIG. 5, CPUs 510 perform various processing based on a program stored in a Read Only Memory (ROM) 516 or a program loaded from a peripheral device, such as disk units 511 and tape drives 513 to a Random Access Memory (RAM) 514. In the RAM 514, required data when the CPU 510 performs the various processing, or the like, is also stored as necessary. The CPU 510, the ROM 516, and the RAM 514 are connected to one another via a bus 512. An input/output adapter 518 is also connected to the bus 512 to provide an input/output interface, as necessary. A removable medium, such as a magnetic disk 440, an optical disk 450, a magneto-optical disk, a semiconductor memory 460, or the like, is installed on the peripheral device, as necessary, so that a computer program read therefrom may be installed into the RAM 514, as necessary.

The system further includes a user interface adapter 519 that connects a keyboard 515, mouse 517, speaker 524, microphone 522, and/or other user interface devices such as a touch screen device (not shown) to the bus 512 to gather user input. Additionally, a communication adapter 520 including a network interface card such as a LAN card, a modem, or the like, connects the bus 512 to a data processing network 525. The communication adapter 520 performs communication processing via a network such as the Internet. A display adapter 521 connects the bus 512 to a display device 523, which may be embodied as an output device such as a monitor (such as a Cathode Ray Tube (CRT), a Liquid Crystal Display (LCD), or the like), printer, or transmitter, for example.

In the case where the above-described series of processing is implemented with software, the program that constitutes the software may be installed from a network such as the Internet or a storage medium, such as the removable medium.

Those skilled in the art would appreciate that, the storage medium is not limited to the peripheral device having the program stored therein as illustrated in FIG. 4, which is distributed separately from the device for providing the program to the user. Examples of a removable medium include a magnetic disk 440 (FIG. 4) (including a floppy disk), an optical disk 450 (including a Compact Disk-Read Only Memory (CD-ROM) and a Digital Versatile Disk (DVD)), a magneto-optical disk (including a Mini-Disk (MD) (registered trademark)), and a semiconductor memory, such as a "plug-and-play" memory device 460. Alternatively, the storage medium may be the ROM 516, a hard disk contained in the storage section 511, or the like, which has the program stored therein and is distributed to the user together with the device that contains them.

As will be appreciated by one skilled in the art, aspects of the systems and methods herein may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects, which may all generally be referred to herein as a "circuit," "module", or "system." Furthermore, aspects of the present disclosure may take the form of a computer program product embodied in one or more computer readable medium(s) having computer readable program code embodied thereon.

Computer program code for carrying out operations for aspects of the present disclosure may be written in any combination of one or more programming languages, including an object oriented programming language such as Java, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the Figures illustrate the architecture, functionality, and operation of possible implementations of systems, methods, and computer program products according to various embodiments herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While only one or a limited number of transistors are illustrated in the drawings, those ordinarily skilled in the art would understand that many different types transistor could be simultaneously formed with the embodiment herein and the drawings are intended to show simultaneous formation of multiple different types of transistors; however, the drawings have been simplified to only show a limited number of transistors for clarity and to allow the reader to more easily recognize the different features illustrated. This is not intended to limit this disclosure because, as would be understood by those ordinarily skilled in the art, this disclosure is applicable to structures that include many of each type of transistor shown in the drawings.

Within a transistor, the semiconductor (or channel region) is positioned between a conductive "source" region and a similarly conductive "drain" region and when the semiconductor is in a conductive state, the semiconductor allows electrical current to flow between the source and drain. A "gate" is a conductive element that is electrically separated from the semiconductor by a "gate oxide" (which is an insulator) and current/voltage within the gate changes the conductivity of the channel region of the transistor.

A positive-type transistor "P-type transistor" uses impurities such as boron, aluminum or gallium, etc., within an intrinsic semiconductor substrate (to create deficiencies of valence electrons) as a semiconductor region. Similarly, an "N-type transistor" is a negative-type transistor that uses impurities such as antimony, arsenic or phosphorous, etc., within an intrinsic semiconductor substrate (to create excessive valence electrons) as a semiconductor region.

Generally, transistor structures are formed by depositing or implanting impurities into a substrate to form at least one semiconductor channel region, bordered by shallow trench isolation regions below the top (upper) surface of the substrate. A "substrate" herein can comprise any material appropriate for the given purpose (whether now known or developed in the future) and can comprise, for example, Si, SiC, SiGe, SiGeC, other III-V or II-VI compound semiconductors, or organic semiconductor structures, etc. The "shallow trench isolation" (STI) structures are well known to those ordinarily skilled in the art and are generally formed by patterning openings/trenches within the substrate and growing or filling the openings with a highly insulating material (this allows different active areas of the substrate to be electrically isolated from one another).

For purposes herein, a "semiconductor" is a material or structure that may include an implanted impurity that allows the material to sometimes be a conductor and sometimes be an insulator, based on electron and hole carrier concentration. As used herein, "implantation processes" can take any appropriate form (whether now known or developed in the future) and can comprise, for example, ion implantation, etc.

The conductors mentioned herein can be formed of any conductive material, such as polycrystalline silicon (polysilicon), amorphous silicon, a combination of amorphous silicon and polysilicon, and polysilicon-germanium, rendered conductive by the presence of a suitable dopant. Alternatively, the conductors herein may be one or more metals, such as tungsten, hafnium, tantalum, molybdenum, titanium, or nickel, or a metal silicide, any alloys of such metals, and may be deposited using physical vapor deposition, chemical vapor deposition, or any other technique known in the art.

For purposes herein, an "insulator" is a relative term that means a material or structure that allows substantially less (<95%) electrical current to flow than does a "conductor." The dielectrics (insulators) mentioned herein can, for example, be grown from either a dry oxygen ambient or steam and then patterned. Alternatively, the dielectrics herein may be formed from any of the many candidate high dielectric constant (high-k) materials, including but not limited to silicon nitride, silicon oxynitride, a gate dielectric stack of SiO2 and Si3N4, and metal oxides like tantalum oxide. The thickness of dielectrics herein may vary contingent upon the required device performance.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements).

The terminology used herein is for the purpose of describing particular embodiments only and is not intended to be limiting of this disclosure. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for regulating voltage in a localized portion of an integrated circuit, comprising:
   an integrated circuit having a voltage input, said integrated circuit comprising at least a localized region that is less than all of said integrated circuit, said localized region requiring a local voltage level;
   a voltage selector establishing a target voltage level for said localized region;
   a first comparator comparing said target voltage level to said local voltage level and generating a pull up control signal when said local voltage level is below said target voltage level;
   a second comparator comparing said target voltage level to said local voltage level and generating a pull down control signal when said local voltage level is above said target voltage level;
   a pull up device responsive to said pull up control signal, said pull up device increasing said local voltage level when said pull up control signal is asserted; and
   a pull down device responsive to said pull down control signal, said pull down device decreasing said local voltage level when said pull down control signal is asserted.

2. The system of claim 1, said voltage selector comprising:
   a programmable reference system for adjusting said target voltage level for said localized region.

3. The system of claim 2, said programmable reference system comprising a multiplexor.

4. The system of claim 1, further comprising:
   a first pass gate connected to an output of said first comparator, said first pass gate being between said output of said first comparator and an input of said pull up device;
   a second pass gate connected to an output of said second comparator, said second pass gate being between said output of said second comparator and an input of said pull down device; and
   a device connected to said voltage selector, said device including a storage component and a comparator component,
      said storage component storing a first selected value for said target voltage level, and
      said comparator component comparing said first selected value for said target voltage level to a second selected value for said target voltage level,
   said device providing a signal to open said first pass gate when said second selected value for said target voltage level is greater than said first selected value for said target voltage level, and
   said device providing a signal to open said second pass gate when said second selected value for said target voltage level is less than said first selected value for said target voltage level.

5. The system of claim 1, said pull up device comprising a PMOS transistor and said pull down device comprising an NMOS transistor.

6. An integrated circuit, comprising:
   a voltage selector connected to a first voltage source;
   a first comparator connected to said voltage selector;
   a second comparator connected to said voltage selector;
   a first voltage adjustment device connected to said first comparator; and
   a second voltage adjustment device connected to said second comparator,
   said voltage selector establishing a target voltage level for a localized region of said integrated circuit,
   said first comparator comparing a local voltage level of said localized region of said integrated circuit to said target voltage level and generating a pull up control signal when said local voltage level is below said target voltage level,
   said second comparator comparing said local voltage level of said localized region of said integrated circuit to said target voltage level and generating a pull down control signal when said local voltage level is above said target voltage level, said first voltage adjustment device increasing said local voltage level when said pull up control signal is asserted, and said second voltage adjustment device decreasing said local voltage level when said pull down control signal is asserted.

7. The integrated circuit of claim 6, said voltage selector comprising:

a programmable reference system for adjusting said target voltage level for said localized region.

8. The integrated circuit of claim 7, said programmable reference system comprising a multiplexor.

9. The integrated circuit of claim 6, further comprising:

a first pass gate connected to an output of said first comparator, said first pass gate being between said output of said first comparator and an input of said first voltage adjustment device;

a second pass gate connected to an output of said second comparator, said second pass gate being between said output of said second comparator and an input of said second voltage adjustment device; and a device connected to said voltage selector, said device including a storage component and a comparator component, said storage component storing a first selected value for said target voltage level, and said comparator component comparing said first selected value for said target voltage level to a second selected value for said target voltage level, said device providing a signal to open said first pass gate when said second selected value for said target voltage level is greater than said first selected value for said target voltage level, and said device providing a signal to open said second pass gate when said second selected value for said target voltage level is less than said first selected value for said target voltage level.

10. The integrated circuit of claim 6, said pull up device comprising a PMOS transistor and said pull down device comprising an NMOS transistor.

* * * * *